(12) United States Patent
Bergman

(10) Patent No.: US 8,286,106 B2
(45) Date of Patent: Oct. 9, 2012

(54) SYSTEM AND METHOD FOR INTERACTING WITH STATUS INFORMATION ON A TOUCH SCREEN DEVICE

(75) Inventor: Eric D. Bergman, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 459 days.

(21) Appl. No.: 12/404,198

(22) Filed: Mar. 13, 2009

(65) Prior Publication Data

US 2010/0235732 A1    Sep. 16, 2010

(51) Int. Cl.
G06F 3/14    (2006.01)
(52) U.S. Cl. .................................. 715/864; 715/802
(58) Field of Classification Search .................. 715/702, 715/864, 810
See application file for complete search history.

(56) References Cited

U.S. PATENT DOCUMENTS

| | | | |
|---|---|---|---|
| 6,750,803 B2 * | 6/2004 | Yates et al. ..................... | 341/176 |
| 7,479,949 B2 | 1/2009 | Jobs et al. | |
| 2005/0024341 A1 * | 2/2005 | Gillespie et al. .............. | 345/173 |
| 2008/0104639 A1 * | 5/2008 | Yoon ............................... | 725/56 |
| 2008/0158189 A1 * | 7/2008 | Kim .............................. | 345/173 |
| 2008/0163082 A1 * | 7/2008 | Rytivaara ...................... | 715/762 |

* cited by examiner

*Primary Examiner* — Omar Abdul-Ali
(74) *Attorney, Agent, or Firm* — Osha Liang LLP

(57) ABSTRACT

A method for interacting with a computing device, involving presenting a first mode of a touch interface, where the touch interface is configured as a user interface of the computing device, where the touch interface comprises at least one status icon, and where in the first mode, the status icon is not selectable by touch input. The method further includes receiving, from a user using the computing device, a first input indicating a desire to switch from the first mode to a second mode of the touch interface; and in response to receiving the first input, presenting the user with the second mode of the touch interface, where in the second mode, the status icon is selectable by touch input, and where the status icon displays a corresponding status of the computing device.

20 Claims, 8 Drawing Sheets

SYSTEM AND METHOD FOR INTERACTING WITH STATUS INFORMATION ON A TOUCH SCREEN DEVICE

BACKGROUND

Many small, hand-held computing devices include graphical user interfaces (GUIs) presented on touch screens. For example, many personal digital assistants, audio players, and mobile phones include touch screen GUIs. Typically, such touch screen GUIs include graphical elements (e.g., buttons, icons, etc.) that a user may select by touch input, thereby enabling the user to interact with the computing device. Such selectable graphical elements are referred to herein as "command icons."

Further, a touch screen GUI may also include a status bar, i.e., a relatively thin horizontal area containing information describing the state of the computing device. For example, the touch screen GUI of a mobile phone may have a status bar including icons describing various states of the mobile phone (e.g., signal strength, battery level, ringer status, alarm mode, network status, etc.). Such icons included in the status bar are referred to herein as "status icons." Typically, the status bar occupies a relatively small portion of the touch screen GUI and is not an interactive part of the GUI.

SUMMARY

In general, in one aspect, the invention relates to a method for interacting with a computing device, including presenting a first mode of a touch interface, wherein the touch interface is configured as a user interface of the computing device, wherein the touch interface comprises a status display portion and a command portion, wherein the status display portion comprises at least one status icon arranged in a first arrangement, wherein the command portion comprises at least one command icon, wherein selecting a command icon initiates a corresponding command action within the computing device, and wherein in the first mode, the at least one status icon is not selectable by touch input and the at least one command icon is selectable by touch input, receiving, from a user using the computing device, a first input indicating a desire to switch from the first mode to a second mode of the touch interface, and in response to receiving the first input, presenting the user with the second mode of the touch interface, wherein in the second mode, the at least one status icon is selectable by touch input, and wherein the at least one status icon displays a corresponding status of the computing device.

In general, in one aspect, the invention relates to a portable communications device, including a processor, a capacitive touch screen, and a computer usable storage medium having computer readable program code embodied therein. The computer readable program code is adapted to, when executed by the processor, implement a method for presenting a user interface, the method including displaying, on the capacitive touch screen, a first mode of a touch interface, wherein the touch interface is configured as a user interface of the portable communications device, wherein the touch interface comprises a status display portion and a command portion, wherein the status display portion comprises at least one status icon arranged in a first arrangement, wherein the command portion comprises at least one command icon, wherein selecting a command icon initiates a corresponding command action within the computing device, and wherein in the first mode, the at least one status icon is not selectable by touch input and the at least one command icon is selectable by touch input, receiving, from a user, a first touch input indicating a desire to switch from the first mode to a second mode of the touch interface, and in response to receiving the first touch input, displaying, on the capacitive touch screen, the second mode of the touch interface, wherein in the second mode, the at least one status icon is selectable by touch input and the at least one command icon is not selectable by touch input, wherein the at least one status icon displays a corresponding status of the computing device.

In general, in one aspect, the invention relates to a computer usable storage medium having computer readable program code embodied therein, the computer readable program code adapted to, when executed by the processor, implement a method for presenting a touch interface. The method includes presenting a first mode of the touch interface, wherein the touch interface is configured as a user interface of a computing device, wherein the touch interface comprises at least one status icon and wherein in the first mode, the at least one status icon is not selectable by touch input, receiving, from a user using the computing device, a first input indicating a desire to switch from the first mode to a second mode of the touch interface, and in response to receiving the first input, presenting the user with the second mode of the touch interface, wherein in the second mode, the at least one status icon is selectable by touch input, wherein the at least one status icon displays a corresponding status of the computing device.

Other aspects of the invention will be apparent from the following description and the appended claims.

DETAILED DESCRIPTION

Figure 1:
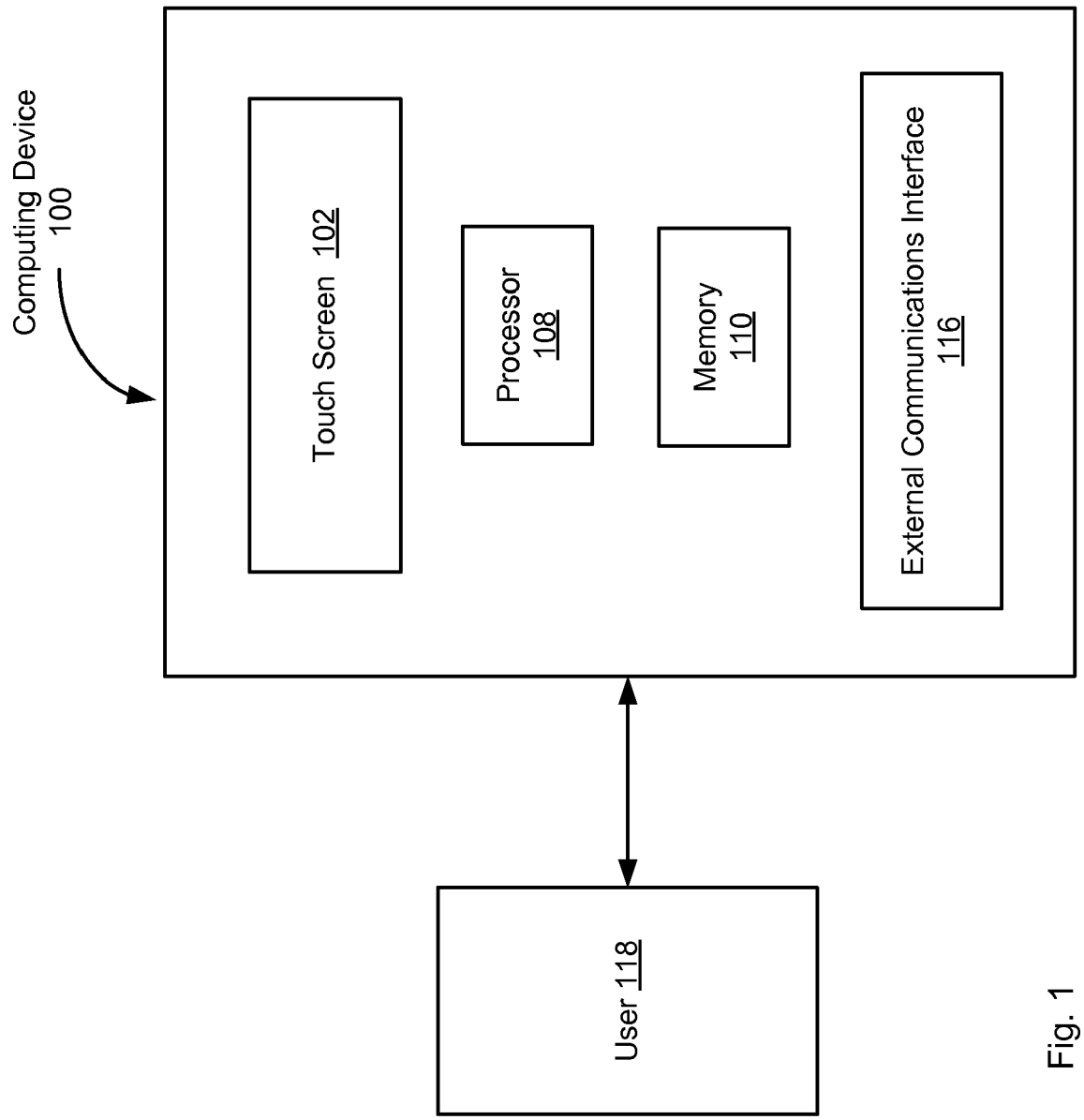
FIG. 1 shows a system in accordance with one or more embodiments of the invention.

Specific embodiments of the invention will now be described in detail with reference to the accompanying Figs. Like elements in the various Figs. are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method system for interacting with status information on a touch screen device. More specifically, embodiments of the invention relate to a method and system for interacting with the status icons in the status bar on a touch screen.

FIG. 1 shows a computing device in accordance with one or more embodiments of the invention. As shown in FIG. 1, the computing device (100) includes a touch screen (102), a processor (108), associated memory (110), an external communication device (116), and numerous other elements and functionalities typical of today's computing devices (not shown). The computing device (100) may be a computer system, a laptop, a media player (i.e., a portable television, a MP3 player, etc), a gaming device, a mobile phone (including a smart phone), a personal digital assistant, or any other suitable wired or wireless computing device.

The touch screen (102) may be a display screen configured to detect the presence and location of a touch within the screen area. That is, the touch screen (102) may provide output means (i.e., a visual display) and input means (i.e., user control via touch input) for the computing device (100). The touch screen (102) may utilize any suitable touch technology now known (e.g., electrical capacitance, electrical resistance, optical imaging, mechanical strain, etc.) or later developed. In one embodiment, the touch screen (102) may present a graphical user interface (GUI) for the computing device (100). An example of such a GUI is discussed in greater detail below with reference to FIGS. 2A-2C.

The computing device includes a processor (108) for executing applications and software instructions configured to perform various functionalities, and memory (110) for storing software instructions and application data. Software instructions (i.e., computer readable program code) adapted to perform embodiments of the invention may be stored on any tangible computer readable storage medium such as a compact disc (CD), a diskette, a tape, a memory stick such as a jump drive or a flash memory drive, or any other computer or machine readable storage device that can be read and executed by the processor (108) of the computing device. The memory (110) may be flash memory, a hard disk drive (HDD), random access memory (RAM), read-only memory (ROM), any other type of suitable storage space, or any combination thereof.

The external communication interface (116) may be an antenna, a serial port, a parallel port, a Universal Serial Bus (USB) interface, or any type of network interface connection, such as Bluetooth® (Bluetooth is a registered trademark of Bluetooth SIG, Inc.), infrared signal, etc. Further, the external communication interface may also support Global System for Mobile (GSM) communications, and 3G and/or 4G standards for mobile phone communication. In one or more embodiments of the invention, the computing device (100) may be connected to a local area network (LAN) or a wide area network (e.g., the Internet) (not shown) via the external communication interface (116). Further, the external communication interface (116) may support both wired and wireless interfaces.

The computing device (100) is typically associated with a user (118) using the computing device (100). For example, the user may be an individual, a company, an organization, a group of individuals, or another computing device. In one or more embodiments of the invention, the user (118) is an individual consumer that uses the computing device (100) as a personal electronic device.

Figure 2A:
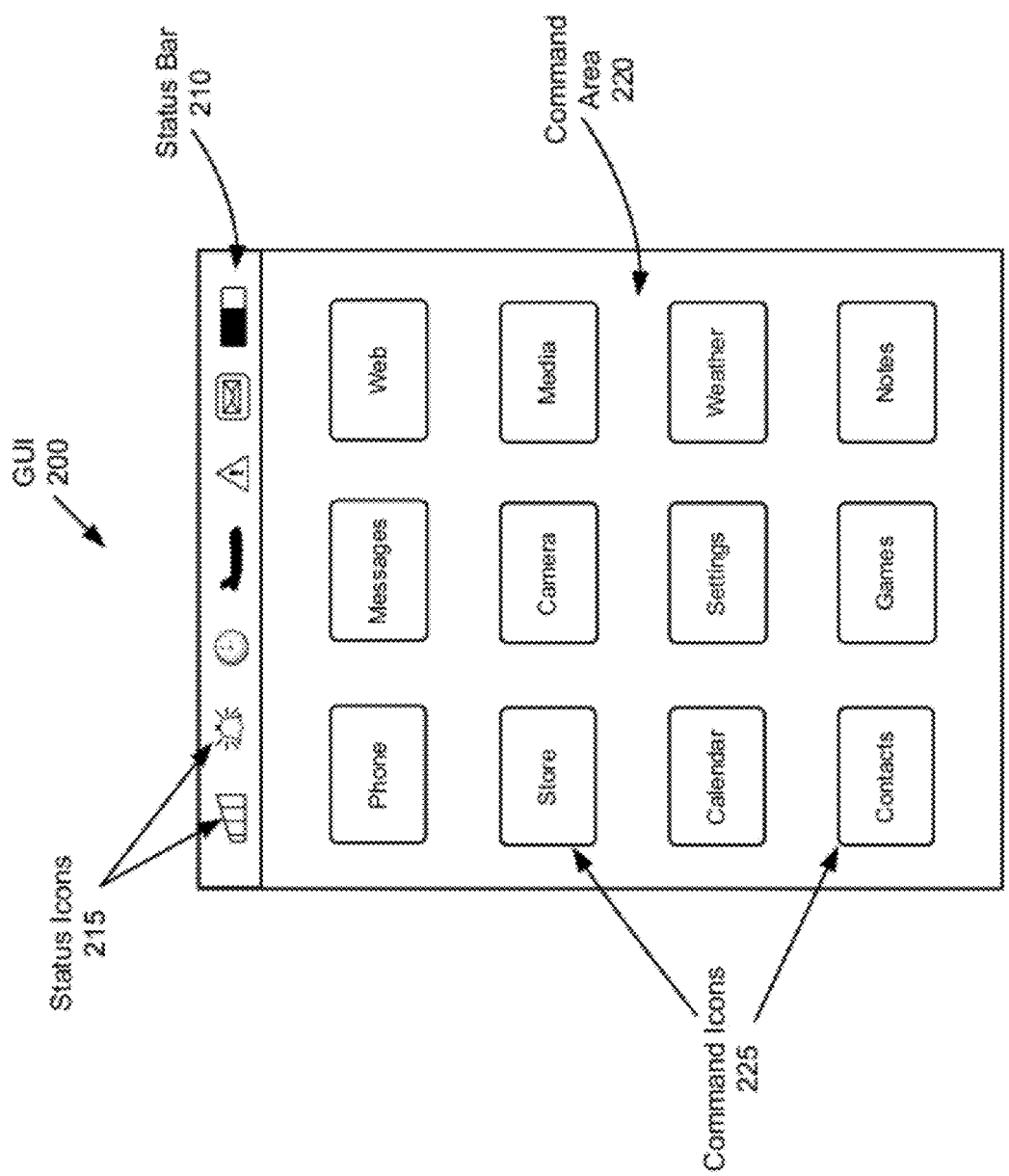
FIGS. 2A-2C show a user interface in accordance with one or more embodiments of the invention.
Figure 2B:
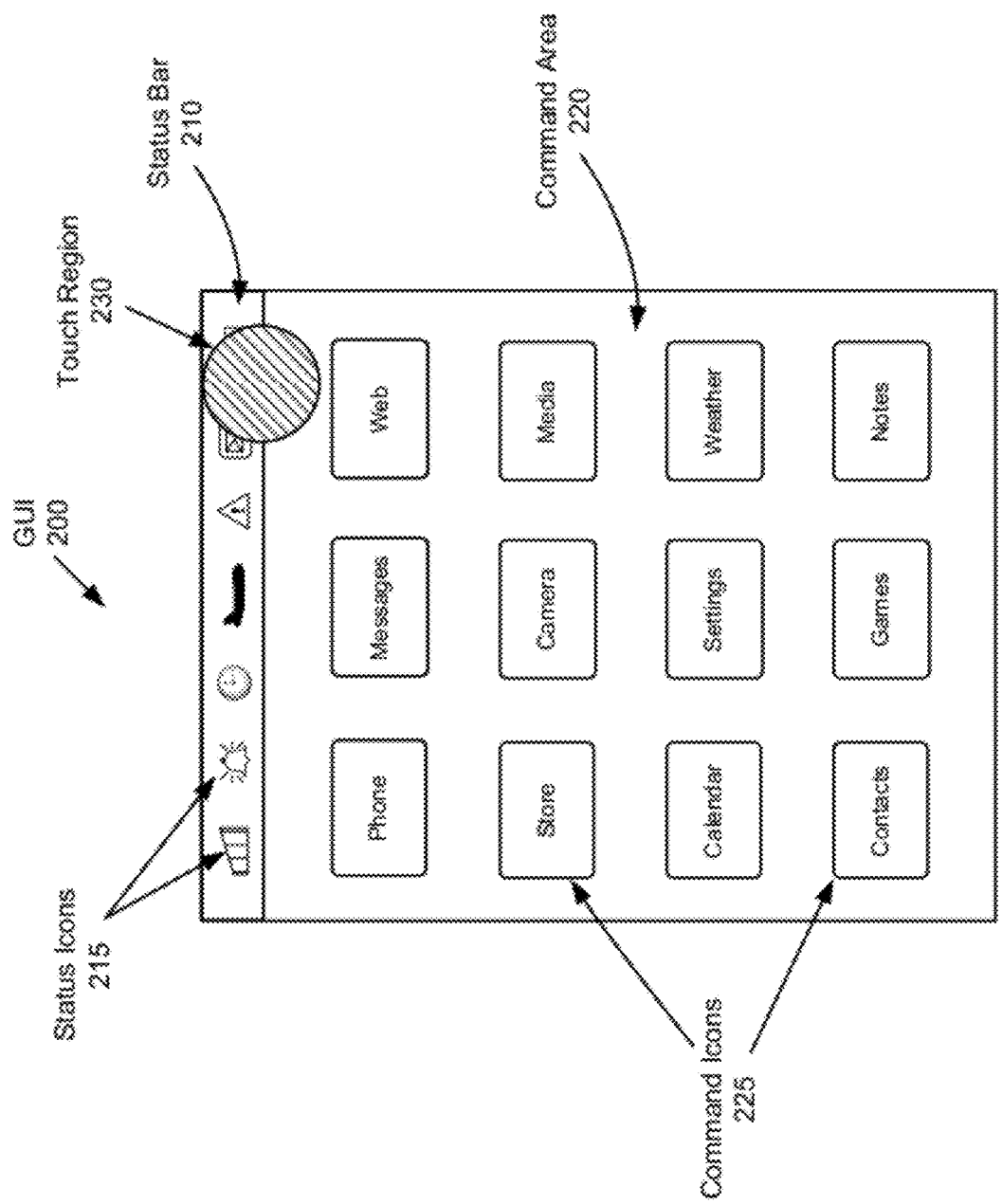
Figure 2C:
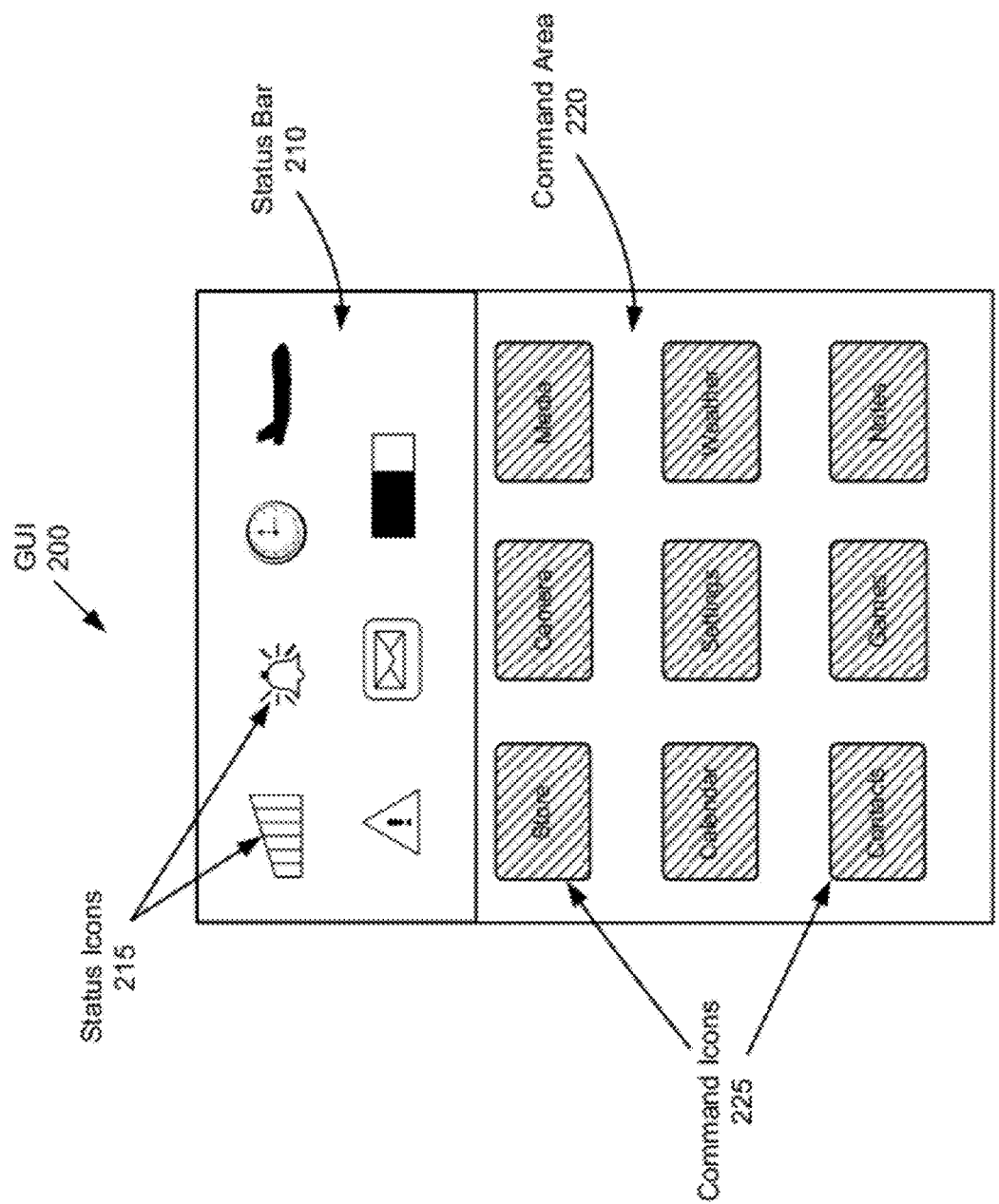

FIGS. 2A-2C illustrate examples of a GUI (200) in accordance with one or more embodiments of the invention. In particular, FIGS. 2A-2C represent examples of the GUI (200) as displayed on a touch screen (e.g., the touch screen (102) shown in FIG. 1) of a computing device (e.g., the computing device (100) shown in FIG. 1). FIG. 2A illustrates a first mode of the GUI (200) in accordance with one or more embodiments of the invention. As shown, the GUI (200) may include a status bar (210) and a command area (220). In one or more embodiments, the status bar (210) may be an area of the GUI (200) that is reserved for the display of status icons (215). Each status icon (215) may be configured to display a corresponding status of the computing device. For example, status icons (215) may communicate a battery level, a current date and/or time, an antenna mode (e.g., enabled/disabled), a network signal level (e.g., no signal, weak signal, medium signal, strong signal), a volume level (e.g., very quiet, quiet, normal, above normal, loud), an alert, and/or any other suitable information associated with the status of the computing device. Those skilled in the art will appreciate that while FIG. 2A shows the status bar as being a horizontal bar located at the top of the GUI, the status bar may be displayed in any orientation (e.g., vertically) and may be located anywhere within the GUI.

The command area (220) may include command icons (225), each of which may be selected to initiate a corresponding command action. In one or more embodiments, each command icon (225) may be selectable by touch input (e.g., touching with a fingertip, with a stylus, etc.) on a touch screen. For example, the user (118) (shown in FIG. 1) may touch a specific command icon (225) displayed on the touch screen with a fingertip, thereby initiating a corresponding command action within the computing device. Such command actions may include, e.g., initiating a telephone call, opening a web browser, playing a song, viewing a calendar, and the like.

In one or more embodiments, the GUI (200) may be presented in two different modes. In the first mode (illustrated in FIG. 2A), the GUI (200) may be configured to allow the user (118) to interact with the command area (220) but not with the status bar (210). That is, in the first mode, the command icons (225) may be individually selected by touch input, but the status icons (215) may not be individually selectable by touch input. Optionally, the command icons (225) may be configured (e.g., shaped and/or sized) to facilitate selection by touch input (e.g., may be approximately the same size as a human fingertip). Further, the status icons (215) may be substantially smaller relative to the command icons (225). For example, in the first mode, the status icons (215) may be substantially smaller than the command icons (225), thereby enabling the status bar (210) to occupy a small portion of the GUI (200) relative to the command area (220).

In one or more embodiments, the GUI (200) may be selectively switched to a second mode (illustrated in FIG. 2C), such that the user using the computing device may interact with the status bar (210). More specifically, in the second mode, the status icons (215) are selectable by touch input, thereby enabling the user to access functionality (i.e., actions) corresponding to the status icons (215). Such functionality may include, e.g., displaying detailed device status information, providing access to device configuration screens, initiating an application, and the like. For example, selecting a status icon (215) communicating a battery level may result in displaying a power consumption configuration screen within the GUI (200). In another example, selecting a status icon (215) communicating an antenna mode may result in displaying a wireless network configuration screen within the GUI (200). The second mode of GUI (200) is described further below with reference to FIG. 2C.

FIG. 2B illustrates a situation in which the user enters a command to switch from the first mode to the second mode of the GUI (200), according to one or more embodiments of the invention. More specifically, the user has touched a portion of the status bar (210) to indicate a desire to switch the GUI (200) to the second mode. The area of contact of the user's finger (or stylus) is represented by a touch region (230). The touch region (230) may be located anywhere on the GUI (200). In one or more embodiments of the invention, the touch region (230) is completely within the status bar (210). Alternatively, the touch region (230) may be partially within the status bar (210) and partially outside of the status bar (210) (i.e., the touch region (230) may overlap with the status bar (210)). Further, the touch region (230) may be any shape, and is not limited to the circular shape that is shown in FIG. 2B. It should be noted that, because the GUI (200) is still in the first mode, any status icons (215) displayed within the touch region (230) are not selected by making contact with the touch region (230). In one or more embodiments, in response to the user's touch input within the touch region 230, the GUI (200) may be switched to the second mode. Optionally, the switch to the second mode begins only after the user's touch input is maintained for a specified, pre-determined time period. The specified, pre-determined time period may be set so as to prevent switching modes due to an accidental or unintended touch input within the status bar (210). Such a specified time period may be a default manufacturer setting, or may be a user defined setting.

FIG. 2C illustrates the second mode of the GUI (200) in accordance with one or more embodiments of the invention. As shown, the status bar (210) may include the same status icons (215) in the second mode as in the first mode. In one or more embodiments of the invention, in the second mode, the status icons (215) are selectable by the user (118). Accordingly, the status icons (215) presented in the second mode may be configured to facilitate selection by touch input. More specifically, in one or more embodiments, the status icons (215) displayed in the second mode may be sized and/or shaped to facilitate selection by touch input. For example, in the second mode, the status icons (215) may be larger than in the first mode. Further, in one or more embodiments, the area of the GUI occupied by the status bar (210) may be larger in the second mode than the area occupied by the status bar (210) in the first mode, thereby accommodating the increased size of the status icons (215). Correspondingly, in one or more embodiments, the size of the command area (220) may be decreased in the second mode, thereby providing space to accommodate the larger size of the status bar (210).

In one or more embodiments, the positions of the status icons (215) in the second mode may be different than the positions of the same status icons (215) in the first mode. For example, in the first mode (e.g., FIG. 2A), all of the status icons (215) may be arranged in a single row within the status bar (210). However, in the second mode (e.g., FIG. 2C), the status icons (215) may be arranged in multiple rows. Such changes in positions of the status icons (215) may be performed, e.g., in order to accommodate the larger sizes of the status icons (215) in the second mode. Further, in one or more embodiments, the change of position of the status icons (215) may be animated during transitions between the first and second modes. That is, as the GUI (200) transitions from the first mode to the second mode (or vice-versa), each status icon (215) may be shown in animated motion, gradually changing in position and size. Such animation may be configured so as to enable the user to track the changing positions of the status icons (215). In one or more embodiments of the invention, the status icons (215) may also stay in motion for a specified period of time when the GUI (200) transitions from the first mode to the second mode (or vice versa). For example, the status icons (215) may "dance" in place during the GUI (200) transition. In addition, one or more sounds may be associated with the status icons (215) while they are in motion during the GUI (200) transition.

As mentioned above, the command icons (225) may not be selectable in the second mode of the GUI (200). Optionally, in one or more embodiments, the command icons (225) are presented with a visual indicator communicating that they are not selectable. For example, as shown in FIG. 2C, while the GUI (200) is in the second mode, the command icons (225) may be presented with a "grayed out" font. Of course, those skilled in the art will appreciate that other visual indicators may be used, such as a text label, a symbol, a color effect, and the like.

FIGS. 3A-3D show flow charts for methods in accordance with one or more embodiments of the invention. In one or more embodiments of the invention, one or more of the steps described below may be omitted, repeated, performed in parallel, and/or performed in a different order. Accordingly, the specific arrangement of steps shown in FIGS. 3A-3D should not be construed as limiting the scope of the invention.

Figure 3A:
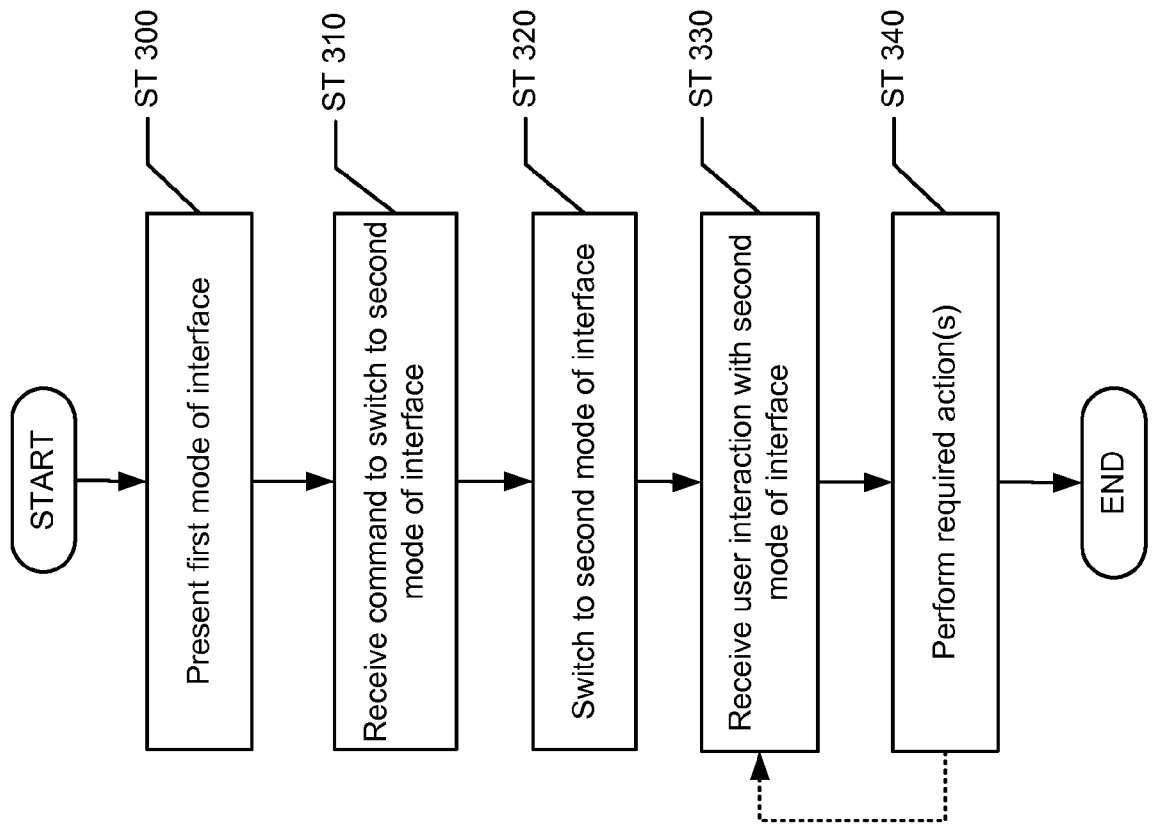
FIGS. 3A-3D show flow charts in accordance with one or more embodiments of the invention.

FIG. 3A shows a flow chart for a method of interacting with a computing device, in accordance with one or more embodiments of the invention. Initially, a first mode of an interface is presented (ST 300). As described above, the first mode of the interface is defined as the status bar icons being non-selectable and the command area icons being selectable. At ST 310, a command to switch the interface to a second mode may be received. In one or more embodiments, the second mode of the interface may enable a user to access functionality that is not accessible in a first mode of the interface. ST 310 is described in greater detail below with reference to FIG. 3B.

In response to the command received at ST 310, the interface may be switched to the second mode (ST 320). ST 320 is described in greater detail below with reference to FIG. 3C. At ST 330, a user interaction during the second mode of the interface is received. For example, the user interaction received at ST 330 may be a command requesting functionality that is not accessible in a first mode of the interface (e.g., touching a status icon). In another example, the user interaction received at ST 330 may be a command requesting a return to the first mode of the GUI (200) (e.g., touching an area outside the status bar). At ST 340, any action(s) required by the user interaction may be performed. Optionally, ST 330 and ST 340 may be repeated for any further user interactions with the second mode of the GUI (200). ST 330 and ST 340 are described in greater detail below with reference to FIG. 3D.

Figure 3B:
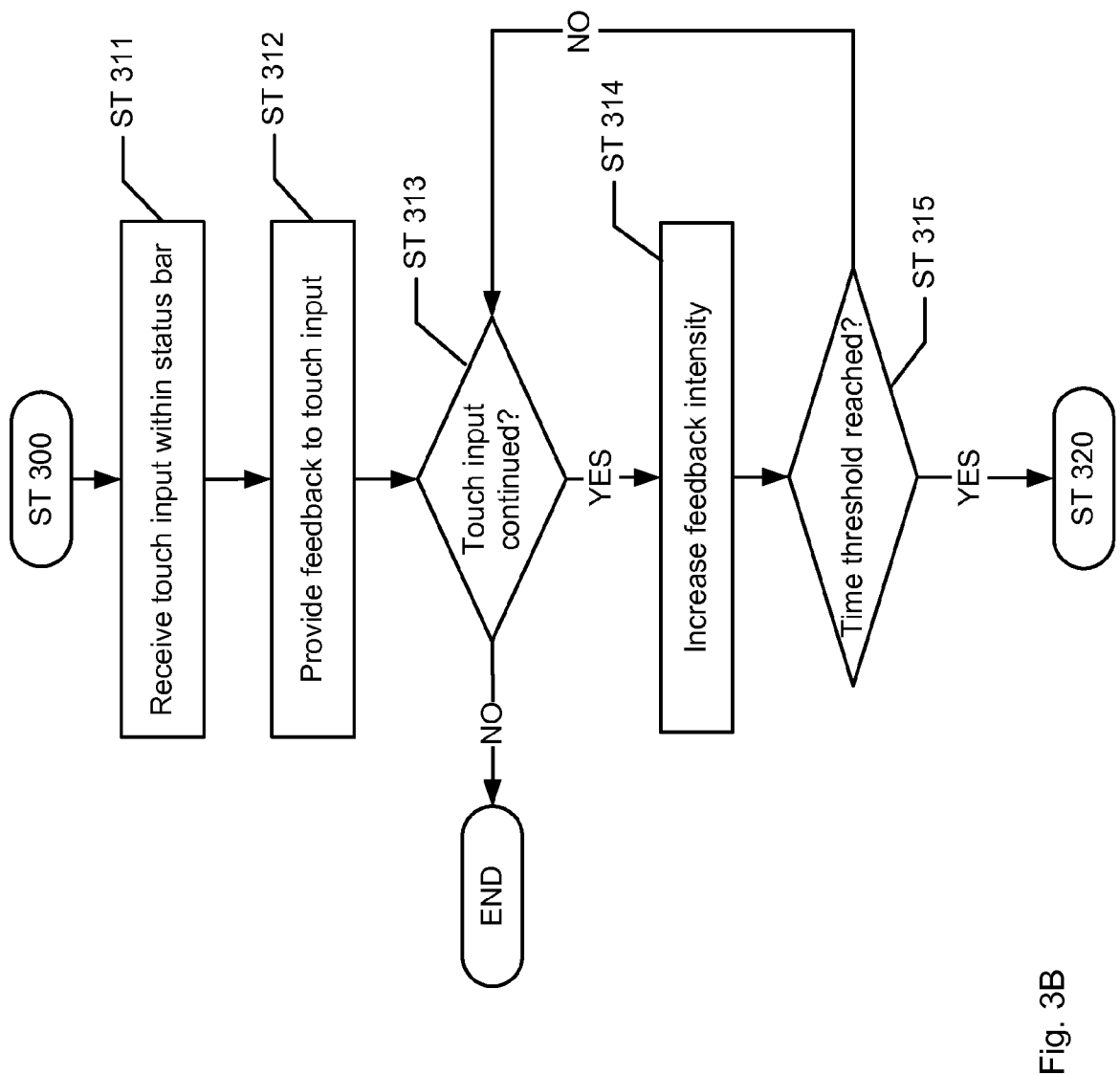

FIG. 3B shows a flow chart for receiving a command to switch to a second mode of an interface, in accordance to one or more embodiments of the invention. In particular, FIG. 3B illustrates an exemplary expansion of the steps involved in performing ST 310 (shown in FIG. 3A) using a touch interface (e.g., the touch screen (102) shown in FIG. 1).

Initially, a touch input may be received within a status bar of a GUI (ST 311). In one or more embodiments, such a touch input may indicate a desire to switch to a second mode of the GUI. For example, referring to FIG. 2B, the user may touch the status bar (210) of the GUI (200), thereby indicating a desire to switch to a second mode of the GUI (200). In the example illustrated in FIG. 2B, the portion of the GUI (200) touched by the user is represented by the touch region (230). However, those skilled in the art will appreciate that the received touch input within a touch region may be an accidental and/or unintended touch on the touch region. Accordingly, before switching to the second mode of the GUI, additional steps may be performed to attempt to determine if the received touch input is valid or invalid.

At ST 312, feedback to the touch input (received at ST 311) is provided to the user. The feedback may be configured to alert the user that a transition to the second mode is beginning. The feedback may include, e.g., a visual indication (a color or animation effect, a text label, a symbol, etc.), a vibration, a sound indication, other like feedback, or any combination thereof. For example, in some situations, a user may touch the status bar inadvertently (i.e., without intending to switch to the second mode of the GUI). In such situations, the feedback may enable the user to terminate the touch input in the touch region, thereby avoiding switching to the second mode of the GUI.

At ST 313, a determination is made as to whether the touch input within the status bar is continued. If not, the process ends (i.e., the interface remains in the first mode). However, if it is determined at ST 313 that the touch input is continued, then at ST 314, the intensity of the feedback may be increased. For example, a vibration alert may become faster, a sound alert may become louder, etc. Next, it may be determined whether a time threshold for the touch input within the status bar has been reached (ST 315). In one or more embodiments, the duration of the time threshold may be predefined, such that accidental touching of the status bar does not result in an unintended switch to the second mode of the GUI. The time threshold may be user defined or set as a default manufacturer setting. For example, the time threshold may be predefined to be two seconds. If the time threshold has not been reached, then the process returns to ST 313. However, if the time threshold has been reached, then the process continues at ST 320 (shown in FIG. 3A). That is, if the duration of the touch input within the status bar is at least as long as the time threshold, then the touch input is considered to be a valid user command to switch to the second mode of the GUI.

Figure 3C:
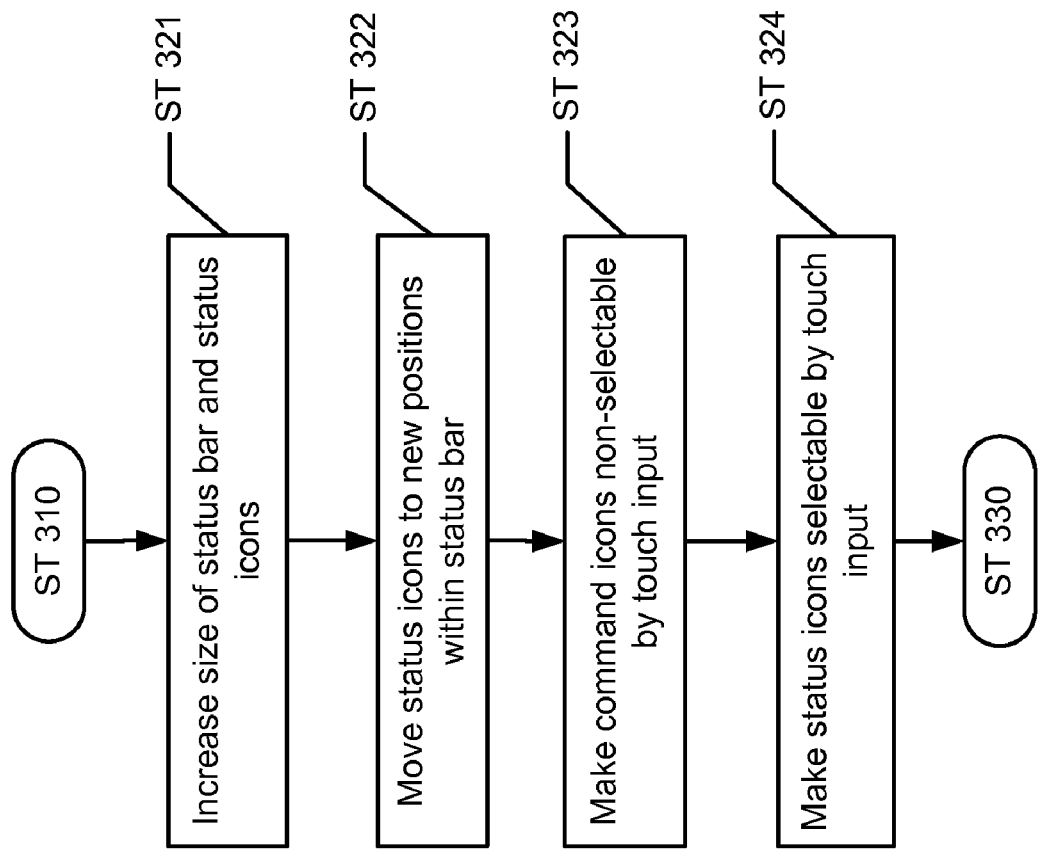

FIG. 3C shows a flow chart for switching to the second mode of the interface, in accordance to one or more embodiments of the invention. In particular, FIG. 3C illustrates an exemplary expansion of the steps involved in performing ST 320 (shown in FIG. 3A) using a GUI displayed on a touch screen (e.g., the GUI (200) shown in FIGS. 2A-2C).

The process begins after receiving a command to switch to the second mode of the GUI (i.e., after ST 310 shown in FIG. 3A). At ST 321, the size of a status bar and status icons included in the GUI may be increased. At ST 322, the status icons may be moved to new positions within the status bar. For example, the status bar (210) and status icons (215) shown in FIG. 2A may be increased in size, resulting in the larger status bar (210) and status icons (215) shown in FIG. 2C. Further, the status icons (215) may be moved to new positions within the status bar (210), so as to accommodate the larger sizes of the status icons (215). Those skilled in the art will appreciate that the invention is not limited to indicating the second mode by a change in size and position of status icons. For example, in one or more embodiments of the invention, the second mode of the GUI may also be indicated by a change in color or background of the status bar, while the size and positions of the status icons remain the same as in the first mode of the GUI.

At ST 323, command icons included in the GUI may be made not selectable by touch input. At ST 324, the status icons included in the status bar may be made selectable by touch input. For example, as shown in FIG. 2C, the command icons (225) are "grayed-out," indicating that they are not selectable by touch input in the second mode of the GUI (200). Further, the status icons (215) of the status bar (210) are made selectable by touch input. Alternatively, the second mode of the GUI may be defined by having both the command icons and the status icons selectable by touch input. After ST 324, the process continues at ST 330 (shown in FIG. 3A).

Figure 3D:
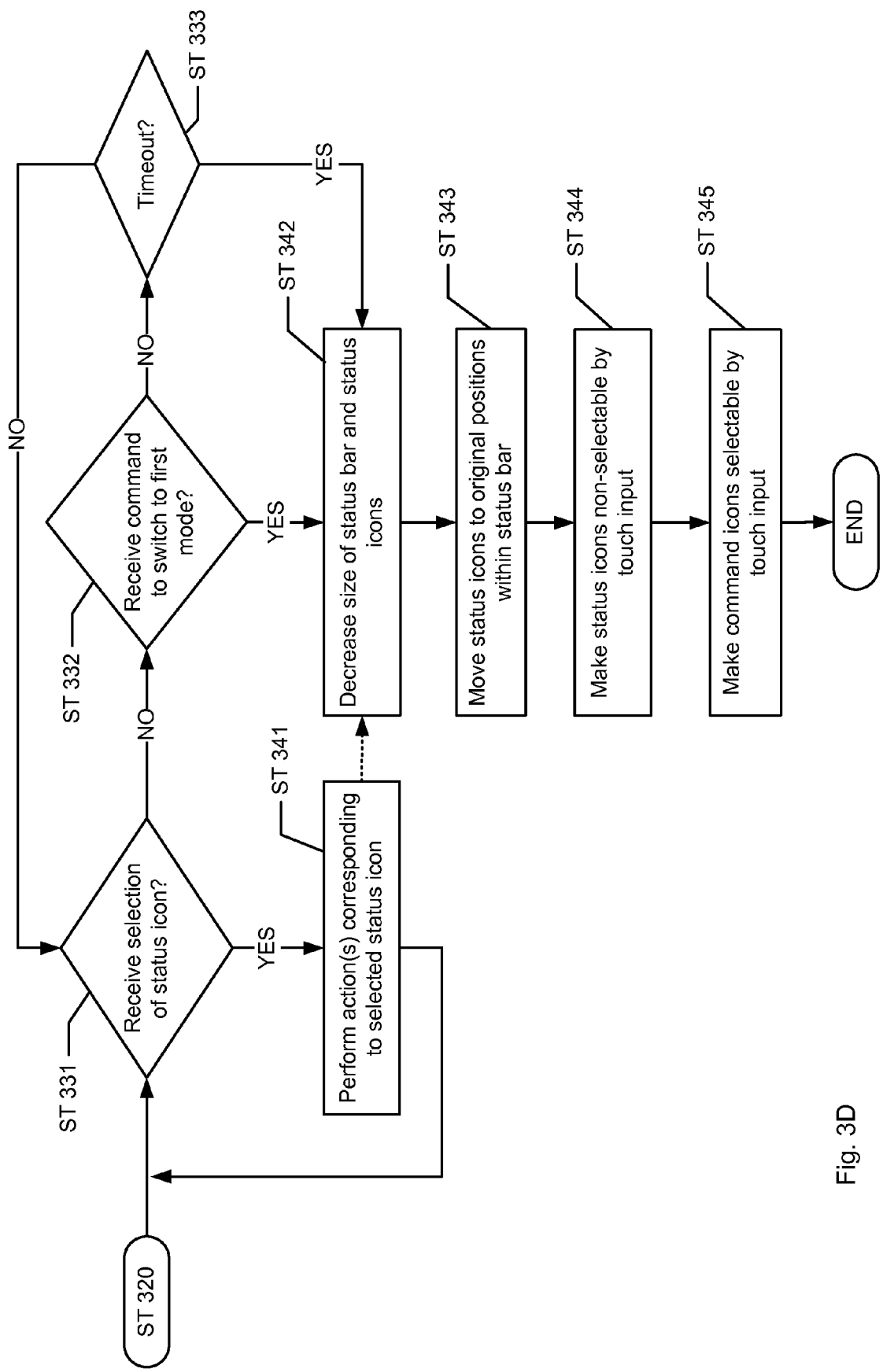

FIG. 3D shows a flow chart for receiving user interactions in the second mode of the interface, in accordance with one or more embodiments of the invention. In particular, FIG. 3D illustrates an exemplary expansion of the steps involved in performing ST 330 and ST 340 (shown in FIG. 3A) using a GUI displayed on a touch screen (e.g., the GUI (200) shown in FIGS. 2A-2C).

The process begins after the GUI has switched to a second mode (i.e., after ST 320 shown in FIG. 3A). Initially, it is determined whether a selection of a status icon has been received (ST 331). If so, then at ST 341, at least one action corresponding to the selected status icon is performed. In one embodiment of the invention, performing the at least one action includes modifying at least one operating characteristic of the computer device. For example, referring to FIG. 2C, the user may select a status icon (215) communicating an antenna mode. In response, the GUI (200) may present a dialog screen to configure a wireless network connection (e.g., a connection using the external communications interface (116) of the computing device (100) shown in FIG. 1). Other examples of operating characteristics that may be modified include, but are not limited to, an energy consumption mode (e.g., full power mode, energy conservation mode, etc.), a speaker level, an antenna mode, a ringer mode (e.g., silent, vibrate, normal, loud), and a security mode (e.g., locked, restricted, unlocked). After performing the action at ST 341, the process returns to ST 331, where it is determined if the user has selected another status icon. Alternatively, after ST 341, the process may continue at ST 342, meaning the GUI may automatically return to the first mode after performing the selected action.

However, if it is determined at ST 331 that a selection of a status icon has not been received, then, at ST 332, it is determined whether a command to switch to the first mode of the GUI has been received. For example, referring to FIG. 2C, the command to switch to the first mode may include touching the command area (220), performing a given touch gesture in the GUI (200), selecting a button or control of the computing device (100), or any other like command. If it is determined at ST 332 that a command to switch to the first mode of the GUI has been received, then at ST 342, the size of the status bar and status icons may be decreased. At ST 343, the status icons may be moved to their original positions within the status bar (i.e., the positions in the first mode of the GUI). For example, the status bar (210) and status icons (215) shown in FIG. 2C may be decreased in size, resulting in the smaller status bar (210) and status icons (215) shown in FIG. 2A. Further, the status icons (215) may be returned to their first mode positions within the status bar (210) (i.e., as shown in FIG. 2A).

At ST 344, the status icons included in the status bar may be made non-selectable by touch input. At ST 345, command icons included in the GUI may be made selectable by touch input. For example, the command icons (225) may be returned to the appearance shown in FIG. 2A (e.g., not "grayed-out"), indicating that they are again selectable by touch input. After ST 345, the process ends.

However, if it is determined at ST 332 that a command to switch to the first mode of the GUI has not been received, then, at ST 333, it is determined whether a specified timeout period has elapsed. If the specified timeout period has not yet elapsed, the process returns to wait for a selection of a status icon at ST 331. However, if it is determined that the timeout period has elapsed, the process may continue at ST 342. That is, if the timeout period has elapsed, the GUI may switch back to the first mode automatically (i.e., by performing ST 342, ST 343, ST 344, and ST 345). For example, referring to FIG. 2C, the GUI (200) may be configured to remain in the second mode for a specified timeout period, thereby providing the user (118) with time to make a selection of a status icon (215). After the timeout period has elapsed, the GUI (200) may automatically return to the first mode (i.e., as shown in FIG. 2A). Alternatively, the GUI may remain in the second mode until an affirmative command to switch to the first mode is received.

One of skill in the art will appreciate that the examples described above are for illustrative purposes only, and are not intended to limit of the invention. For example, while the user interface is described herein in terms of a touch screen, embodiments of the invention may also include any other suitable user interface displays (e.g., cathode ray displays, liquid crystal displays, plasma displays, virtual reality goggles, etc.) and controls (e.g., computer mouse, light pen, keyboard, button, voice command, gestures, etc.). Further, while the user interface is described herein as being part of a portable computing device, embodiments of the invention may also include user interfaces of any other device (e.g., computers, televisions, printers, entertainment devices, etc.).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for interacting with a computing device, comprising:
    presenting, via a touch interface, a first mode user interface of the computing device, wherein presenting the first mode user interface comprises:
        presenting a first mode status display portion comprising a plurality of individually non-selectable status icons arranged in a first arrangement, wherein the plurality of individually non-selectable status icons display a corresponding status of the computing device, and
        presenting a first mode command portion comprising at least one individually selectable command icon, wherein selecting the at least one individually selectable command icon initiates a corresponding command action within the computing device, and wherein the plurality of individually non-selectable status icons are not selectable by touch input and the at least one individually selectable command icon is selectable by touch input;
    receiving, from a user using the computing device, a first input indicating a selection of one of the plurality of individually non-selectable status icons; and
    in response to receiving the first input, presenting the user with a second mode user interface of the touch interface, wherein presenting the second mode user interface comprises:
        presenting a second mode status display portion comprising a plurality of individually selectable status icons, wherein the plurality of individually selectable status icons are individually selectable by touch input, and wherein the plurality of individually selectable status icons display a corresponding status of the computing device, and
        presenting a second mode command portion comprising at least one individually non-selectable command icon.

2. The method of claim 1, wherein the touch interface is a capacitive touch screen configured to detect a finger touch.

3. The method of claim 1, further comprising, prior to presenting the user with the second mode user interface:
    providing the user with a feedback indication of the first input.

4. The method of claim 3, wherein the feedback indication is at least one selected from a group consisting of an auditory indication, a tactile indication, and a visual indication.

5. The method of claim 1, further comprising, prior to presenting the user with the second mode user interface:
    determining that a time duration of the first input has reached a predefined threshold.

6. The method of claim 1, wherein the at least one individually non-selectable command icon is not selectable by touch input.

7. The method of claim 1, wherein the second mode status display portion is larger than the first mode status display portion.

8. The method of claim 7, wherein presenting the user with the second mode command portion is smaller than the first mode command portion.

9. The method of claim 1, wherein the plurality of individually selectable status icons in the second mode status display portion are larger than the plurality of individually non-selectable status icons in the first mode status display portion.

10. The method of claim 1, wherein the plurality of individually selectable status icons in the second mode status display portion are arranged in a second arrangement within the second mode status display portion.

11. The method of claim 10, wherein presenting the second mode status display portion comprises displaying an animated movement of the plurality of individually non-selectable status icons in the first arrangement to the plurality of individually selectable status icons in the second arrangement.

12. The method of claim 1, wherein the computing device is one selected from a group consisting of a personal digital assistant, a media player, a gaming device, and a mobile phone.

13. The method of claim 1, further comprising, after presenting the user with the second mode user interface:
    receiving a selection of one of the plurality of individually selectable status icons corresponding to the selected one of the plurality of individually non-selectable status icons; and
    performing at least one action corresponding to the selected one of the plurality of individually selectable status icons.

14. The method of claim 13, wherein performing the at least one action comprises modifying at least one operating characteristic of the computing device.

15. The method of claim 14, wherein the at least one operating characteristic of the computing device is one selected from a group consisting of an energy consumption mode, a speaker level, an antenna mode, a ringer mode, a network connection, and a security mode.

16. The method of claim 15, further comprising, presenting, in response to the performing the at least one action, the user with the first mode user interface by performing one selected from a group consisting of decreasing the size of the second mode status display portion, increasing the size of the second mode command portion, reducing the size of the one of the plurality of individually selectable status icons, and returning the one of the plurality of individually selectable status icons to the first arrangement within the first mode status display portion.

17. A portable communications device, comprising:
    a processor;
    a capacitive touch screen; and
    a computer usable storage medium having computer readable program code embodied therein, the computer readable program code adapted to, when executed by the processor, implement a method for presenting a user interface, the method comprising:
        displaying, on the capacitive touch screen, a first mode touch interface, wherein displaying the first mode touch interface is configured as a user interface of the portable communications device, wherein displaying the first mode touch interface comprises:
- displaying a first mode status display portion comprising a plurality of individually non-selectable status icons arranged in a first arrangement, wherein the plurality of individually non-selectable status icons display a corresponding status of the computing device, and
- displaying a first mode command portion comprising at least one individually selectable command icon, wherein selecting the at least one individually selectable command icon initiates a corresponding command action within the computing device, and wherein the plurality of individually non-selectable status icons are not selectable by touch input and the at least one individually selectable command icon is selectable by touch input;
- receiving, from a user, a first touch input indicating a selection of one of the plurality of individually non-selectable status icons; and
- in response to receiving the first touch input, displaying, on the capacitive touch screen, a second mode touch interface, wherein displaying the second mode user interface comprises:
  - displaying a second mode status display portion comprising a plurality of individually selectable status icons, wherein the plurality of individually selectable status icons are individually selectable by touch input, and
  - displaying a second mode command portion comprising at least one individually non-selectable command icon, wherein the at least one individually non-selectable command icon is not selectable by touch input.

18. The portable communications device of claim 17, wherein the first mode status display portion and the first mode command portion are distinct two-dimensional areas of the touch interface.

19. A computer usable storage medium having computer readable program code embodied therein, the computer readable program code adapted to, when executed by the processor, implement a method for presenting a touch interface, the method comprising:
- presenting, via a touch interface, a first mode user interface of the computing device, wherein presenting the first mode user interface comprises:
  - presenting a first mode status display portion comprising a plurality of individually non-selectable status icons arranged in a first arrangement, wherein the plurality of individually non-selectable status icons display a corresponding status of the computing device, and
  - presenting a first mode command portion comprising at least one individually selectable command icon, wherein selecting the at least one individually selectable command icon initiates a corresponding command action within the computing device, and wherein, the the plurality of individually non-selectable status icons are not selectable by touch input and the at least one individually selectable command icon is selectable by touch input;
- receiving, from a user using the computing device, a first input indicating a selection of one of the plurality of individually non-selectable status icons; and
- in response to receiving the first input, presenting the user with a second mode user interface of the touch interface, wherein presenting the second mode user interface comprises:
  - presenting a second mode status display portion comprising a plurality of individually selectable status icons, wherein the plurality of individually selectable status icons are individually selectable by touch input, and wherein the plurality of individually selectable status icons display a corresponding status of the computing device, and
  - presenting a second mode command portion comprising at least one individually non-selectable command icon.

20. The computer usable storage medium of claim 19, wherein the method further comprises, after presenting the user with the second mode user interface:
- receiving a selection of one of the plurality of individually selectable status icons corresponding to the selected one of the plurality of individually non-selectable status icons; and
- performing at least one action corresponding to the selected one of the plurality of individually selectable status icons,
- wherein performing the at least one action comprises modifying at least one operating characteristic of the computing device, and
- wherein the at least one operating characteristic of the computing device is one selected from a group consisting of an energy consumption mode, a speaker level, an antenna mode, a ringer mode, a network connection, and a security mode.

* * * * *